United States Patent
Weber et al.

(10) Patent No.: US 11,504,293 B2
(45) Date of Patent: Nov. 22, 2022

(54) SEAT ASSEMBLY HAVING MASSAGE BLADDERS WITH REDUCED PRESSURE SENSOR COUNT

(71) Applicant: Lear Corporation, Southfield, MI (US)

(72) Inventors: Charles Francis Weber, Dexter, MI (US); Bryan M. Vartanian, Livonia, MI (US); Samuel A. Heap, Jr., Canton, MI (US)

(73) Assignee: LEAR CORPORATION, Southfield, MI (US)

( * ) Notice: Subject to any disclaimer, the term of this patent is extended or adjusted under 35 U.S.C. 154(b) by 1189 days.

(21) Appl. No.: 15/345,999

(22) Filed: Nov. 8, 2016

(65) Prior Publication Data
US 2018/0125744 A1 May 10, 2018

(51) Int. Cl.
*A61H 9/00* (2006.01)
*B60N 2/90* (2018.01)
*A61H 1/00* (2006.01)

(52) U.S. Cl.
CPC ........... *A61H 9/0078* (2013.01); *A61H 1/008* (2013.01); *B60N 2/976* (2018.02); *A61H 2201/0103* (2013.01); *A61H 2201/0149* (2013.01); *A61H 2201/1238* (2013.01); *A61H 2201/164* (2013.01); *A61H 2201/1623* (2013.01); *A61H 2201/50* (2013.01); *A61H 2201/5071* (2013.01)

(58) Field of Classification Search
CPC ........ A61H 9/00; A61H 9/005; A61H 9/0078; A61H 2201/0149; B60N 2/976; B60N 2/665; A47C 27/08; A47C 27/081; A47C 27/082; A47C 27/083; A47C 27/084; A47C 4/54; A61G 7/057; A61G 7/05769; A61G 7/05776
See application file for complete search history.

(56) References Cited

U.S. PATENT DOCUMENTS 4,190,286 A * 2/1980 Bentley .................. B60N 2/914
297/284.3
4,552,402 A 11/1985 Huber et al.
4,634,179 A 1/1987 Hashimoto et al.
(Continued)

FOREIGN PATENT DOCUMENTS

CN 104473748 A 4/2015
CN 105012121 A 11/2015
(Continued)

OTHER PUBLICATIONS

AFD China Intellectual Property Law Firm, First Chinese Office Action and Machine English language translation for corresponding Chinese Patent Application No. 201710817257X dated Feb. 3, 2020.
(Continued)

*Primary Examiner* — Justine R Yu
*Assistant Examiner* — Christopher E Miller
(74) *Attorney, Agent, or Firm* — Brooks Kushman PC,

(57) ABSTRACT

A seat assembly includes first and second bladders and a controller. The first bladder has a sensor configured to detect a pressure of the first bladder. The controller is configured to inflate the first bladder to a target pressure, as detected by the sensor, and to inflate the second bladder based on time expended for the first bladder to be inflated to the target pressure.

12 Claims, 3 Drawing Sheets

(56) References Cited

U.S. PATENT DOCUMENTS

| | | | |
|---|---|---|---|
| 4,655,505 A | | 4/1987 | Kashiwamura et al. |
| 4,707,027 A | * | 11/1987 | Horvath ............... B60N 2/914 297/284.6 |
| 4,833,614 A | * | 5/1989 | Saitoh ............... B60N 2/0224 296/65.16 |
| 5,155,685 A | * | 10/1992 | Kishi ............... B60N 2/914 701/49 |
| 5,307,791 A | * | 5/1994 | Senoue ............... A61H 9/0078 128/DIG. 20 |
| 5,320,409 A | * | 6/1994 | Katoh ............... B60N 2/0232 297/284.6 |
| 5,558,398 A | * | 9/1996 | Santos ............... A47C 4/54 297/284.3 |
| 5,575,762 A | * | 11/1996 | Peeler ............... A61H 9/0078 601/152 |
| 5,762,618 A | * | 6/1998 | Yamanaka ............... A47C 4/54 601/148 |
| 5,876,359 A | * | 3/1999 | Bock ............... A61H 9/0078 601/150 |
| 5,968,073 A | * | 10/1999 | Jacobs ............... A61B 34/74 601/152 |
| 5,987,370 A | * | 11/1999 | Murphy ............ B60R 21/01516 701/45 |
| 6,055,473 A | * | 4/2000 | Zwolinski ............ B60N 2/002 701/49 |
| 6,088,642 A | * | 7/2000 | Finkelstein ............ B60N 2/002 701/49 |
| 6,088,643 A | | 7/2000 | Long et al. |
| 6,203,105 B1 | * | 3/2001 | Rhodes, Jr. ............... A47C 4/54 297/284.6 |
| 6,231,532 B1 | * | 5/2001 | Watson ............... A61H 9/0078 601/148 |
| 6,361,512 B1 | * | 3/2002 | Mackay ............... A61H 9/0078 601/149 |
| 6,786,879 B1 | | 9/2004 | Bolam et al. |
| 7,044,924 B1 | * | 5/2006 | Roth ............... A61H 9/0078 128/DIG. 20 |
| 9,457,694 B2 | * | 10/2016 | Ebel ............... F17C 5/06 |
| 9,925,084 B2 | * | 3/2018 | Tanaka ............... A63B 21/0088 |
| 10,369,074 B2 | | 8/2019 | Oberg et al. |
| 10,492,979 B2 | | 12/2019 | Norman et al. |
| 2001/0000262 A1 | * | 4/2001 | McEwen ............... A61H 9/0078 601/11 |
| 2001/0004679 A1 | * | 6/2001 | Ichikawa ............... A61H 9/0078 601/98 |
| 2002/0108180 A1 | * | 8/2002 | Odderson ............... A47C 27/10 5/654 |
| 2003/0038517 A1 | * | 2/2003 | Moran ............... B60N 2/914 297/284.3 |
| 2003/0078674 A1 | * | 4/2003 | Phillips ............... A61F 2/7843 623/37 |
| 2003/0080699 A1 | * | 5/2003 | Rumney ............... B60N 2/0244 318/9 |
| 2003/0181990 A1 | * | 9/2003 | Phillips ............... A61F 2/7843 623/37 |
| 2004/0054306 A1 | * | 3/2004 | Roth ............... A61H 9/0078 601/152 |
| 2004/0056520 A1 | * | 3/2004 | Cho ............... A47C 7/405 297/218.1 |
| 2004/0106884 A1 | * | 6/2004 | Bolam ............... A61H 9/0078 601/152 |
| 2004/0237203 A1 | * | 12/2004 | Romano ............... A47C 27/20 5/713 |
| 2005/0187500 A1 | * | 8/2005 | Perry ............... A61H 9/0078 601/152 |
| 2005/0203687 A1 | * | 9/2005 | Fortune ............ B60R 21/01516 701/45 |
| 2006/0236464 A1 | * | 10/2006 | Beck ............... A61G 7/05776 5/713 |
| 2007/0049853 A1 | * | 3/2007 | Adams ............... A61H 9/0078 601/151 |
| 2010/0042026 A1 | * | 2/2010 | Kloecker ............... A61F 5/34 601/149 |
| 2010/0078974 A1 | | 4/2010 | Nathan |
| 2010/0137764 A1 | * | 6/2010 | Eddy ............... A61H 9/0078 601/152 |
| 2010/0244504 A1 | | 9/2010 | Colja et al. |
| 2011/0172579 A1 | * | 7/2011 | Chiu ............... A61F 5/055 602/36 |
| 2011/0224589 A1 | * | 9/2011 | Bock ............... A61H 9/0078 601/152 |
| 2012/0079662 A1 | * | 4/2012 | Dzioba ............... A61G 7/05776 5/713 |
| 2012/0143108 A1 | * | 6/2012 | Bocsanyi ............... B60N 2/976 601/148 |
| 2012/0280554 A1 | * | 11/2012 | Brncick ............... B60N 2/66 297/452.41 |
| 2013/0306161 A1 | * | 11/2013 | Zhao ............... A47C 7/00 137/14 |
| 2014/0059781 A1 | * | 3/2014 | Lafleche ............... A61B 5/0205 5/713 |
| 2014/0094726 A1 | * | 4/2014 | Malhi ............... A61F 13/08 601/152 |
| 2014/0207333 A1 | | 7/2014 | Vandivier et al. |
| 2014/0232155 A1 | | 8/2014 | Bocsanyi |
| 2015/0126916 A1 | | 5/2015 | Hall et al. |
| 2015/0209206 A1 | | 7/2015 | Bargellini et al. |
| 2015/0308885 A1 | * | 10/2015 | Griffin ............... B60R 21/01516 73/862.581 |
| 2015/0352979 A1 | | 12/2015 | O'Bannon et al. |
| 2015/0352990 A1 | | 12/2015 | Zouzal et al. |
| 2015/0374571 A1 | * | 12/2015 | Denson ............... A61H 1/008 601/150 |
| 2016/0046207 A1 | | 2/2016 | Arant et al. |
| 2016/0106620 A1 | * | 4/2016 | Uno ............... A61H 9/0078 601/149 |
| 2016/0129820 A1 | | 5/2016 | Cloutier |
| 2016/0200228 A1 | * | 7/2016 | Saren ............... A61H 9/0078 601/150 |
| 2016/0206103 A1 | | 7/2016 | Zouzal et al. |
| 2016/0213553 A1 | * | 7/2016 | Oberg ............... A61H 9/0078 |
| 2016/0229320 A1 | * | 8/2016 | Lem ............... B60N 2/914 |
| 2017/0172830 A1 | * | 6/2017 | Newton ............... A47C 27/10 |
| 2017/0172838 A1 | * | 6/2017 | Brosnan ............... A61H 9/0078 |
| 2018/0147964 A1 | * | 5/2018 | Ogiso ............... B60N 2/914 |

FOREIGN PATENT DOCUMENTS

| | | |
|---|---|---|
| CN | 105555599 A | 5/2016 |
| CN | 106032117 A | 10/2016 |
| CN | 106038198 A | 10/2016 |
| DE | 3142833 A1 | 5/1983 |
| DE | 20202403 U1 | 6/2003 |
| DE | 102013225690 A1 | 7/2014 |
| DE | 102016100316 A1 | 7/2016 |
| EP | 1447070 A1 | 8/2004 |
| WO | 0100132 A2 | 1/2001 |

OTHER PUBLICATIONS

The State Intellectual Property Office of People's Republic of China, The Second Office Action tor corresponding Chinese Patent Application No. 201710817257.X dated Sep. 23, 2020.

German Patent and Trademark Office, German Office Action for corresponding German Patent Application No. DE 10 2017 214 244.8 dated Oct. 15, 2020.

* cited by examiner

SEAT ASSEMBLY HAVING MASSAGE BLADDERS WITH REDUCED PRESSURE SENSOR COUNT

TECHNICAL FIELD

The present invention relates to seats having inflatable massage bladders.

BACKGROUND

One type of seat assembly includes massaging air bladders in the seating surface. The bladders are inflated and deflated in a predetermined massage cycle. The bladders have their own pressure sensors. The pressure sensors detect the air pressures of their bladders. During a massage cycle the inflating (i.e., the filling) of a bladder is terminated upon the detected air pressure of a bladder, as detected by the pressure sensor of the bladder, reaching a target air pressure.

A problem is that the pressure sensor cost of the seat assembly having "X" amount of pressure sensors for "X" amount of bladders is "X" times the cost of one pressure sensor.

SUMMARY

A seat assembly has a seat having massaging air bladders. For instance, the bladders are in a seating surface (e.g., a seat cushion) of the seat. The bladders are inflatable and deflatable in any of various predetermined massage cycles. The massage cycles progress through the bladders in periodic profiles to provide massage functions. An occupant of the seat may adjust the massage intensity causing the bladders to be filled to a corresponding greater or lesser target air pressure.

Fewer than all of the bladders have their own pressure sensors. For instance, only a single one of the bladders has a pressure sensor and none of the other bladders has a pressure sensor. For example, assuming that the seat has first, second, third, and fourth bladders, only the first bladder has a pressure sensor. The pressure sensor of the first bladder is configured to detect the air pressure of the first bladder. A controller of the seat assembly is configured to compare the detected air pressure of the first bladder to a target air pressure.

The controller is further configured to inflate and deflate the first bladder according to the detected air pressure of the first bladder relative to the target air pressure. As part of the operation of the massage cycles, the controller is further configured to inflate each of the second, third, and fourth bladders based on the time it took to inflate the first bladder to the target air pressure.

The controller controls the inflating and deflating of the bladders in accordance with the massage cycles. The controller initiates a massage cycle by inflating the first bladder having the pressure sensor. The controller starts a timer upon inflating the first bladder (which is initially deflated), stops the timer and terminates the inflation (i.e., the filling) of the first bladder upon the air pressure of the first bladder as detected by the pressure sensor of the first bladder reaching a target air pressure, and records from the timer the time (i.e., "the fill time") it took for the first bladder to be inflated to the target air pressure.

Subsequently, as part of the massage cycle, the controller inflates at least one of the other bladders for a fill time based on the fill time of the first bladder (i.e., based on the time it took to inflate the first bladder to the target air pressure). For instance, after the controller inflates the first bladder to have the target air pressure, the controller inflates the second bladder for a fill time based on the fill time of the first bladder and subsequently or concurrently inflates the third bladder for a fill time based on the fill time of the first bladder and subsequently or concurrently inflates the fourth bladder for a fill time based on the fill time of the first bladder.

If all relevant factors between the first bladder and the at least one of the other bladders are identical (i.e., same bladder size, volume, elasticity; same length of air tubing; same rate/volume of air filling the bladders; same target air pressure; etc.), then the controller inflates the at least one of the other bladders for the same fill time as the fill time of the first bladder. If any of the relevant factors between the first bladder and the at least one of the other bladders are different, then the controller inflates the at least one of the other bladders for a fill time based on (i) the fill time of the first bladder and (ii) an adjustment time factor which accounts for the differences between the relevant factors.

Upon completion of the massage cycle with progression through the bladders, the massage cycle repeats with the first bladder which has been deflated during the completed iteration of the massage cycle. The controller initiates the next iteration of the massage cycle by inflating the first bladder to the target air pressure (or perhaps to a different target air pressure than the target air pressure of the previous iteration of the massage cycle). The controller records the fill time of the first bladder to be inflated to the target air pressure. The controller uses the updated fill time of the first bladder in inflating the other bladders during the remainder of the massage cycle in manners as described above.

An embodiment provides a seat assembly including first and second bladders and a controller. The first bladder has a sensor configured to detect a pressure of the first bladder. The controller is configured to inflate the first bladder to a target pressure, as detected by the sensor, and to inflate the second bladder based on time expended for the first bladder to be inflated to the target pressure.

An embodiment provides a method for a seat assembly having first and second bladders. The method includes detecting a pressure of the first bladder with a pressure sensor. The method further includes inflating the first bladder to a target pressure, as detected by the pressure sensor. The method further includes inflating the second bladder based on time expended for the first bladder to be inflated to the target pressure.

An embodiment provides a seat assembly having a seat with a seat bottom, first, second, third, and fourth bladders in the seat bottom, and a controller. The first bladder has a pressure sensor configured to detect a pressure of the first bladder. The second, third, and fourth bladders lack a pressure sensor. The controller is configured to inflate, according to a massage cycle, the first bladder to a target pressure, as detected by the pressure sensor, to inflate, according to the massage cycle, the second, third, and fourth bladders based on time expended for the first bladder to be inflated to the target pressure.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
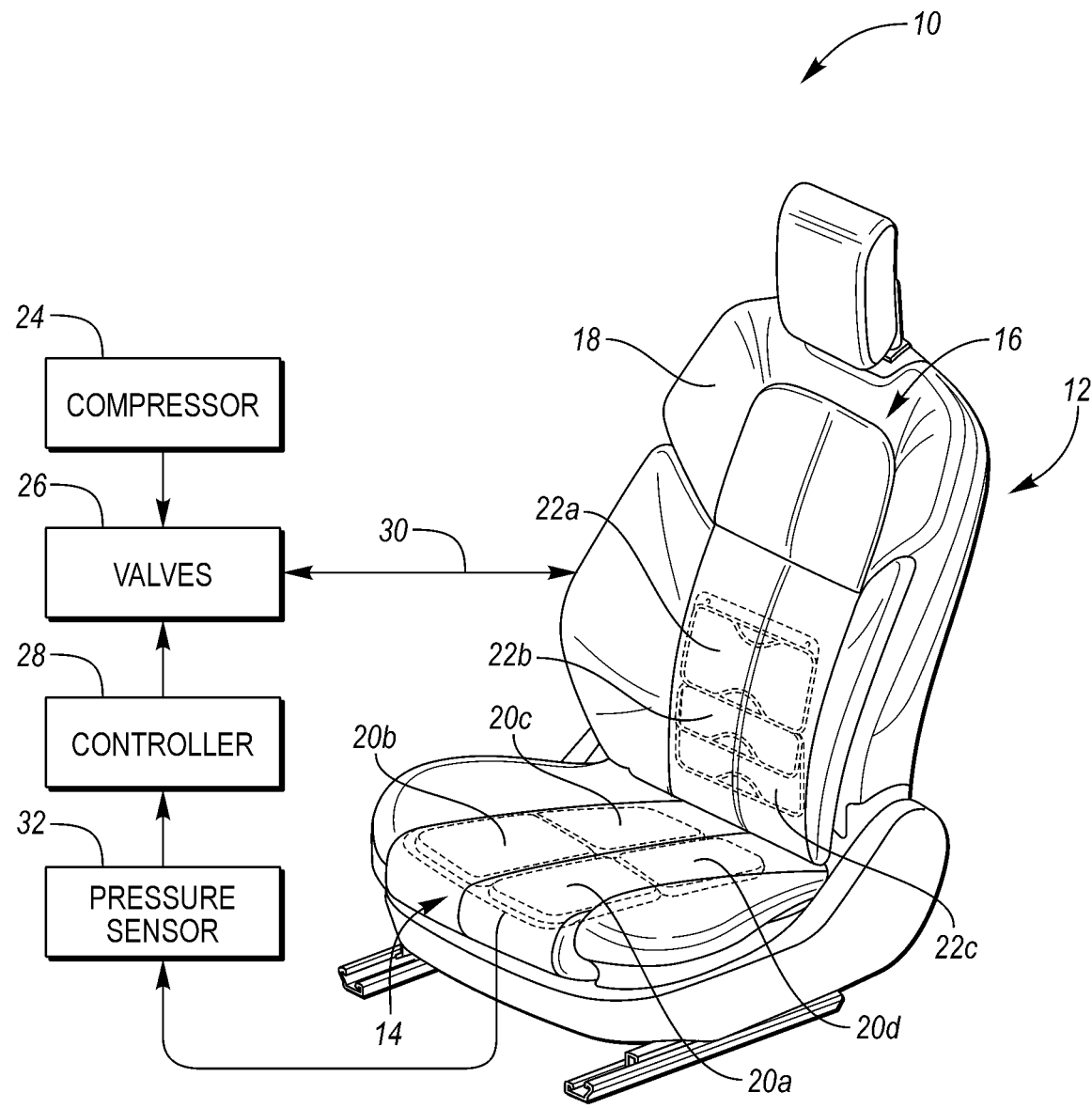
FIG. 1 illustrates a perspective view of a seat of a seat assembly and a block diagram of components of the seat assembly.

Referring now to FIG. 1, a perspective view of a seat 12 of a seat assembly 10 and a block diagram of components of the seat assembly are shown. Seat assembly 10 may be configured for use in vehicular and/or non-vehicular applications. Vehicular applications may include land vehicles such as cars, trucks, and trains, and non-land vehicles such as aircraft or marine vessels. Non-vehicular applications may include home or office furniture such as chairs or the like.

Seat 12 of seat assembly 10 includes a seat bottom ("seat cushion") 14 and a seat back 16. Seat cushion 14 is configured to support the sitting region of a seat occupant. Seat back 16 is configured to support the back of the seat occupant. Seat back 16 is pivotably connected to seat cushion 14 to extend upright relative to seat portion 14. Seat 12 further includes a cover 18 which covers or upholsters seat cushion 14 and seat back 16.

As shown in phantom in FIG. 1, seat 12 includes a first set of air bladders disposed in a central portion of seat cushion 14 and a second set of air bladders disposed in a central portion of seat back 16. The bladders are inflatable and deflatable. The bladders of seat cushion 14 include a forward left air bladder 20a, a forward right air bladder 20b, a rear right air bladder 20c, and a rear left air bladder 20d. Hence, seat cushion 14 has four bladders. This is exemplary as seat cushion 14 has at least two bladders. The bladders of seat back 16 include a top air lumbar bladder 22a, a middle lumbar air bladder 22b, and a bottom lumbar air bladder 22c. This is exemplary as seat back 16 has at least two bladders.

The components of seat assembly 10 include a compressor 24, a plurality of valves 26, and a controller 28. Compressor 24 provides a source of air for inflating the bladders. Valves 26 receive the compressed air from compressor 24. Valves 26 are in fluid communication respectively with the bladders via respective air tubes (generally indicated by reference numeral 30). Each bladder is fluidly connected by a respective air tube 30 to receive the compressed air from compressor 24 via a respective valve 26. Air tubes 30 may be configured as flexible tubes, hoses, or the like. Controller 28 controls valves 26 to regulate the air into and out the bladders. In this way, the bladders are each adjustable and can be individually or collectively inflated and deflated.

Compressor 24 may be provided in seat cushion 14, seat back 16, or concealed within an environment external to seat 12. Valves 26 may be provided as a common valve bank that is housed in seat back 16 or under seat cushion 14; or the valves may each be provided on each of the air bladders. Controller 28 may be provided in a module under seat cushion 14, and may be a multi-function controller that also controls other seat functions.

Bladders 20a, 20b, 20c, and 20d of seat cushion 14 are configured as "massage" air bladders. Controller 28 inflates and deflates bladders 20a, 20b, 20c, and 20d in any of a plurality of predetermined massage cycles to massage the sitting region of the seat occupant. The seat occupant may adjust the massage intensity causing bladders 20a, 20b, 20c, and 20d to be filled to a corresponding greater or lesser target air pressure.

The massage cycles progress through bladders 20a, 20b, 20c, and 20d in periodic profiles to provide different massage functions. For instance, a massage function may involve bladders 20a, 20b, 20c, and 20d being individually inflated and deflated one at a time; another massage function may involve forward bladders 20a and 20b being collectively inflated while rear bladders 20c and 20d are collectively deflated and forward bladders 20a and 20b being collectively deflated while rear bladders 20c and 20d are collectively inflated; another massage function may involve left bladders 20a and 20d being collectively inflated while right bladders 20b and 20c are collectively deflated and left bladders 20a and 20d being collectively deflated while right bladders 20b and 20c are collectively inflated; etc.

Not all of bladders 20a, 20b, 20c, and 20d have pressure sensors. For example, in an exemplary embodiment described herein, just a single one of bladders 20a, 20b, 20c, and 20d has a pressure sensor. As indicated in FIG. 1, it will be assumed that only forward left bladder 20a ("first bladder 20a") has a pressure sensor 32. As such, none of the other bladders 20b, 20c, and 20d ("second bladder 20b", "third bladder 20c", and "fourth bladder 20d") has a pressure sensor.

Pressure sensor 32 of first bladder 20a is configured to detect the air pressure in first bladder 20a. Any pressure sensor is contemplated, such as a pneumatic pressure sensor at the outlet valve of first bladder 20a. Pressure can also be sensed by a contact pressure sensor disposed in front of or behind first bladder 20a, including on a front or rear surface thereof. The contact pressure sensor may be a pressure-sensitive mat.

Pressure sensor 32 of first bladder 20a provides to controller 32 a signal indicative of a value of the detected air pressure of first bladder 20a. Controller 28 is configured to compare the detected air pressure of first bladder 20a to a target air pressure and controls the inflating and deflating of first bladder 20a according to the detected air pressure of first bladder 20a (i.e., the actual air pressure of first bladder 20a) relative to the target air pressure. For instance, controller 28 is configured to inflate first bladder 20a when the detected air pressure is less than a target air pressure and deflate first bladder 20a when the detected air pressure is greater than a target air pressure.

Figure 2:
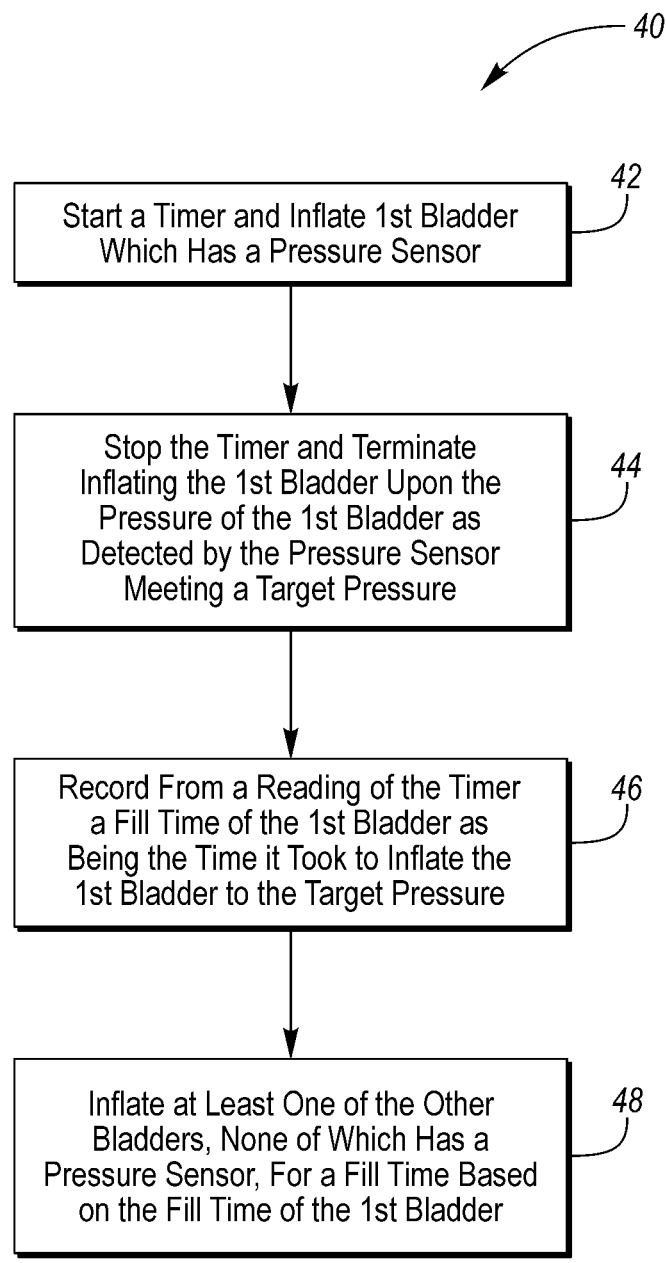
FIG. 2 illustrates a flowchart depicting a general massage operation of the seat assembly.

Referring now to FIG. 2, with continual reference to FIG. 1, a flowchart 40 depicting a general massage operation of seat assembly 10 is shown. Controller 28 controls the inflating and deflating of bladders 20a, 20b, 20c, and 20d in accordance with the massage operation. Controller 28 initiates the massage operation by starting a timer and inflating (i.e., filling) first bladder 20a having pressure sensor 32 as indicated in block 42. Controller 28 stops the timer and terminates the inflation of first bladder 20a upon the air pressure of the first bladder, as detected by pressure sensor 32, reaching a target air pressure as indicated in block 44. Controller 28 records from the timer the time (i.e., "the fill time") it took for first bladder 20a to be inflated to the target air pressure as indicated in block 46.

Controller 28 continues with the massage operation by inflating at least one of the other bladders 20b, 20c, and 20d, which none have a pressure sensor, for a fill time based on the fill time of first bladder 20a (i.e., for a fill time based on the time it took to inflate first bladder 20a to the target air pressure) as indicated in block 48. For instance, controller 28 subsequently and/or concurrently inflates: second bladder 20b for a second fill time based on the fill time of first bladder 20a; third bladder 20c for a third fill time based on the fill time of first bladder 20a; and fourth bladder 20d for a fill time based on the fill time of first bladder 20a.

Upon completion of the massage operation with progression through bladders 20a, 20b, 20c, and 20d, the massage operation repeats with first bladder 20a. Controller 28 initiates the next iteration of the massage operation by inflating first bladder 20a having pressure sensor 32 to the target air pressure (or perhaps to a different target air pressure than the target air pressure of the previous iteration of the massage operation) (blocks 42 and 44). Controller 28 records the fill time of first bladder 20a to be inflated to the target air pressure (block 46). Controller uses the updated fill time of first bladder 20a in inflating the other bladders 20b, 20c, and 20d not having a pressure sensor during the remainder portion of the iteration of the massage operation (block 48).

As such, controller 28 uses first bladder 20a having pressure sensor 32 in the massage operation as being a bladder that detects and is sensitive to the weight of the seat occupant. In seat assembly 10, pressure sensor 32 is retained at least in first bladder 20a as the seat occupant weight is a significant factor in the control of the massage intensity adjustment.

The fill time of first bladder 20a depends on factors including bladder pressure, occupant weight, pump output efficiency (including system voltage, temperature, barometric pressure, manufacturing pump variation and wear), etc.

In some embodiments, bladders 20a, 20b, 20c, and 20d are identical bladders having identical characteristics (e.g., same size, volume, elasticity, valve size, air tube length, etc.). In certain massage cycles, bladders 20a, 20b, 20c, and 20d are to be inflated to the same target air pressure. Thus, in these massage cycles, controller inflates bladders 20b, 20c, and 20d not having pressure sensors for a fill time equal to the fill time of first bladder 20a. For instance, if the fill time of first bladder 20a is two seconds, then controller 28 inflates the other bladders 20b, 20c, and 20d for two seconds; if the fill time of first bladder 20a is nine seconds, then controller 28 inflates the other bladders 20b, 20c, and 20d for nine seconds; etc. In other massage cycles, bladders 20a, 20b, 20c, and 20d are to be inflated to different target air pressures. Thus, in these other massage cycles, controller 28 inflates each bladder 20b, 20c, and 20d not having a pressure sensor for a fill time based on (i) the fill time of first bladder 20a and (ii) a difference between the target air pressure of first bladder 20a and a target air pressure of bladder 20b, 20c, and 20d not having a pressure sensor.

In some embodiments, bladders 20a, 20b, 20c, and 20d are different from one another (e.g. different, size, volume, elasticity, valve size, air tube length, etc.). In certain massage cycles, bladders 20a, 20b, 20c, and 20d are to be inflated to the same target air pressure. Thus, in these massage cycles, controller 28 inflates bladders 20b, 20c, and 20d not having pressure sensors for a fill time based on (i) the fill time of first bladder 20a and (ii) a factor taking into account the differences with first bladder 20a. For instance, assume second bladder 20b is one-half (three times, ten times, etc.) the size of first bladder 20a. In this case, second bladder 20b is inflated for one-half (three times, ten times, etc.) the fill time of first bladder 20a. In other massage cycles, bladders 20a, 20b, 20c, and 20d are to be inflated to different target air pressures. Thus, in these other massage cycles, controller 28 inflates each bladder 20b, 20c, and 20d not having a pressure sensor for a fill time based on (i) the fill time of first bladder 20a, (ii) a factor taking into account the differences with first bladder 20a, and (iii) a difference of the different target air pressure with the target air pressure of first bladder 20a.

In some embodiments, additional considerations are taken into account. For instance, for stability, the accumulated recorded fill times of first bladder 20a may be averaged through a filter. For feel and comfort, the actual fill times, based on first bladder 20a, may be configured when used on second, third, fourth bladders 20b, 20c, and 20d to account for predetermined filling tube length in any specific seat application. For feel and comfort, the actual fill times, based on first bladder, may be configured when used on second, third, and fourth bladders 20b, 20c, and 20d to account for predetermined body weight distribution across seat cushion 14 front-to-rear and side-to-side in any specific application. For feel and comfort, the actual fill times, based on first bladder 20a, may be configured when used on second, third, and fourth bladders 20b, 20c, and 20d to account for bladder designed size across seat cushion 14 front-to-rear and side-to-side in any specific application.

As described, seat assembly 10 has multiple massaging bladders 20a, 20b, 20c, and 20d with only first bladder 20a having a pressure sensor 32. Accordingly, the pressure sensor cost of seat assembly 10 is the cost of one pressure sensor even though the seat assembly has multiple bladders. In particular, the pressure count of seat assembly 10 with four bladders 20a, 20b, 20c and 20d is reduced by 75% from four pressure sensors of the four bladders to one pressure sensor 32 of first bladder 20a.

Figure 3:
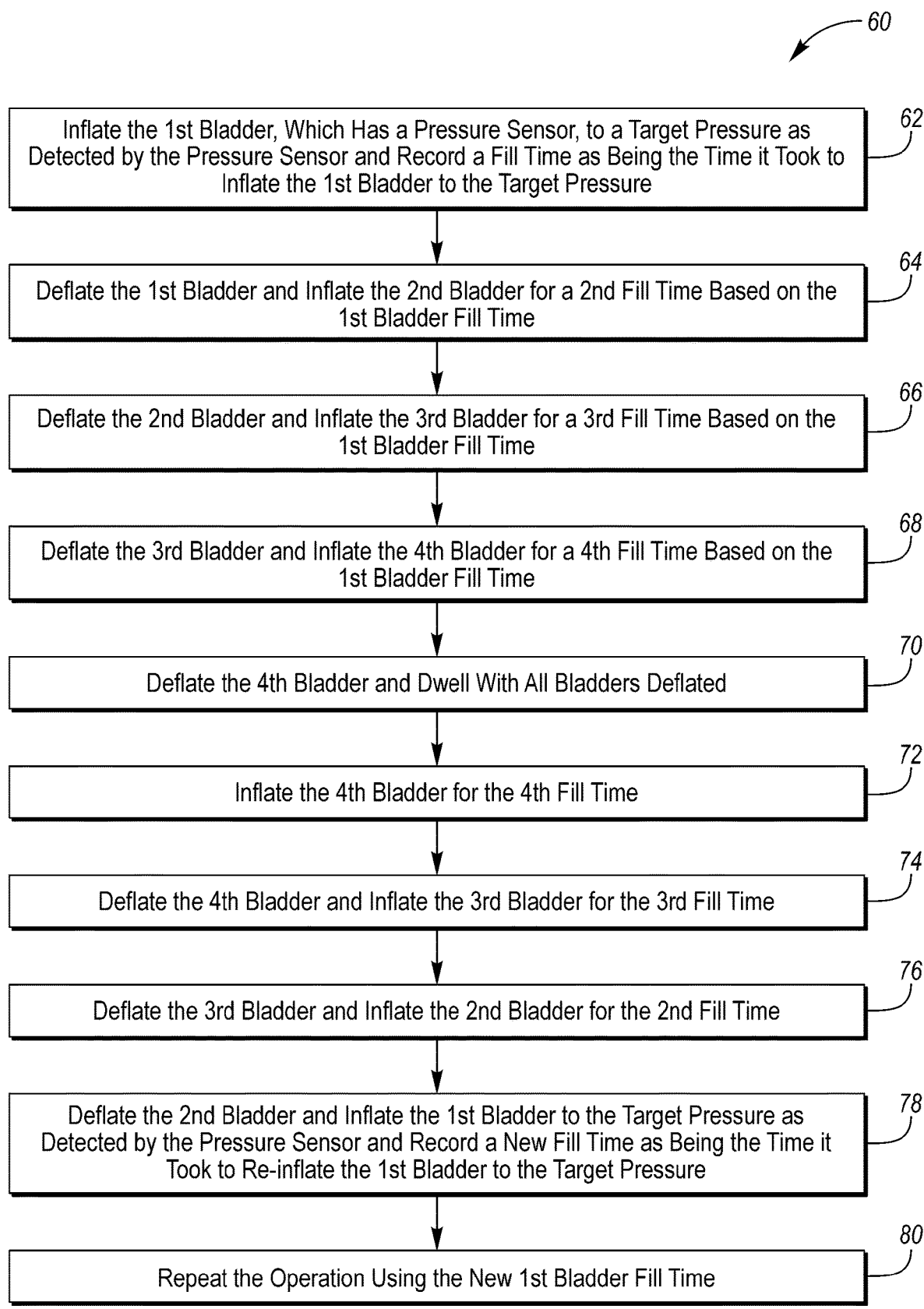
FIG. 3 illustrates a flowchart depicting a specific exemplary massage operation of the seat assembly.

Referring now to FIG. 3, with continual reference to FIGS. 1 and 2, a flowchart 60 depicting a specific exemplary massage operation of seat assembly 10 is shown. Controller 28 initiates the massage operation by inflating first bladder 20a having pressure sensor 32 to a target pressure as detected by pressure sensor 32 and recording the fill time it took to inflate first bladder 20a to the target air pressure as indicated in block 62.

Controller 28 then deflates first bladder 20a and inflates second bladder 20b, which does not have a pressure sensor, for a second fill time based on the fill time of first bladder 20a as indicated in block 64. Controller 28 then deflates second bladder 20b and inflates third bladder 20c, which does not have a pressure sensor, for a third fill time based on the fill time of first bladder 20a as indicated in block 66. Controller 28 then deflates third bladder 20c and inflates fourth bladder 20d, which does not have a pressure sensor, for a fourth fill time based on the fill time of first bladder 20a as indicated in block 68. Controller 28 then deflates fourth bladder 20d and lets bladders 20a, 20b, 20c, and 20d dwell deflated for a period of time as indicated in block 70.

Controller 28 then inflates fourth bladder 20d for the fourth fill time as indicated in block 72. Controller 28 then deflates fourth bladder 20d and inflates third bladder 20c for the third fill time as indicated in block 74. Controller 28 then deflates third bladder 20c and inflates second bladder 20b for the second fill time as indicated in block 76. Controller 28 then deflates second bladder 20b and inflates first bladder 20b to the target pressure as detected by pressure sensor 32 and records a new fill time it took to re-inflate first bladder 20a to the target air pressure as indicated in block 78. The massage operation (starting at block 64) is then repeated as indicated in block 80.

In some embodiments, lumbar bladders 22a, 22b, and 22c of seat back 16 are configured as massaging lumbar bladders with just one of the lumbar bladders having a pressure sensor in accordance with massage operations described herein.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A seat assembly comprising:
   a seat having a seat bottom;
   a first bladder in the seat bottom, the first bladder having a pressure sensor configured to detect a pressure of the first bladder only;
   a second bladder in the seat bottom, the seat assembly lacking any pressure sensor configured to detect a pressure of the second bladder; and
   a controller configured to set a target pressure according to a selection of an occupant sitting on the seat bottom, to inflate the first bladder for a time dependent on a weight of the occupant sitting on the seat bottom until the pressure of the first bladder reaches to the target pressure, as detected by the pressure sensor of the first bladder, and to inflate the second bladder based on the time expended for the first bladder to be inflated to the target pressure.

2. The seat assembly of claim 1 further comprising:
   a third bladder, the seat assembly lacking any pressure sensor configured to detect a pressure of the third bladder; and
   wherein the controller is further configured to inflate the third bladder based on the time expended for the first bladder to be inflated to the target pressure.

3. The seat assembly of claim 1 wherein:
   the controller is further configured to deflate the first bladder and the second bladder, to re-inflate the first bladder to the target pressure, as detected by the pressure sensor of the first bladder, and to re-inflate the second bladder based on (i) the time expended for the first bladder to be inflated to the target pressure and (ii) a time expended for the first bladder to be re-inflated to the target pressure.

4. The seat assembly of claim 1 wherein
   the controller is further configured to inflate the second bladder based on (i) the time expended for the first bladder to be inflated to the target pressure and (ii) a factor accounting for a difference between the target pressure and a different target pressure of the second bladder.

5. The seat assembly of claim 1 wherein
   the controller is further configured to inflate the second bladder based on (i) the time expended for the first bladder to be inflated to the target pressure and (ii) a factor accounting for any differences between the first bladder and the second bladder.

6. The seat assembly of claim 1 wherein
   the controller is further configured to start a timer upon inflating the first bladder to the target pressure, stop the timer and terminate the inflating of the first bladder upon the pressure of the first bladder, as detected by the pressure sensor of the first bladder, reaching the target pressure, and to record from a reading of the timer the time expended for the first bladder to be inflated to the target pressure.

7. A method for a seat assembly having a seat including a seat bottom, a first bladder in the seat bottom, and a second bladder in the seat bottom, the first bladder having a pressure sensor configured to detect a pressure of the first bladder only and the seat assembly lacking any pressure sensor configured to detect a pressure of the second bladder, the method comprising:
   setting a target pressure according to a selection of an occupant sitting on the seat bottom;
   detecting a pressure of the first bladder with the pressure sensor of the first bladder;
   inflating the first bladder for a time dependent on a weight of the occupant sitting on the seat bottom until the pressure of the first bladder reaches to the target pressure, as detected by the pressure sensor of the first bladder; and
   inflating the second bladder based on the time expended for the first bladder to be inflated to the target pressure.

8. The method of claim 7, wherein the seat assembly further includes a third bladder, the seat assembly lacking any pressure sensor configured to detect a pressure of the third bladder, the method further comprising:
   inflating the third bladder based on a time expended for the first bladder to be inflated to the target pressure.

9. The method of claim 7 further comprising:
   deflating the first bladder and the second bladder;
   re-inflating the first bladder to the target pressure, as detected by the pressure sensor of the first bladder; and
   re-inflating the second bladder based on (i) the time expended for the first bladder to be inflated to the target pressure and (ii) a time expended for the first bladder to be re-inflated to the target pressure.

10. The method of claim 7 wherein:
    inflating the second bladder includes inflating the second bladder based on (i) the time expended for the first bladder to be inflated to the target pressure and (ii) a factor accounting for a difference between the target pressure and a different target pressure of the second bladder.

11. The method of claim 7 wherein:
    inflating the second bladder includes inflating the second bladder based on (i) the time expended for the first bladder to be inflated to the target pressure and (ii) a factor accounting for any differences between the first bladder and the second bladder.

12. The method of claim 7 further comprising:
    starting a timer upon inflating the first bladder to the target pressure;
    stopping the timer;
    terminating the inflating of the first bladder upon the pressure of the first bladder, as detected by the pressure sensor of the first bladder, reaching the target pressure; and
    recording from a reading of the timer the time expended for the first bladder to be inflated to the target pressure.

* * * * *